United States Patent
Hoetzendorfer

(10) Patent No.: US 10,036,127 B2
(45) Date of Patent: Jul. 31, 2018

(54) CLEANING VEHICLE FOR CLEANING BALLAST OF A TRACK

(71) Applicant: Plasser & Theurer Export von Bahnbaumaschinen Gesellschaft m.b.H., Vienna (AT)

(72) Inventor: Patrick Hoetzendorfer, Engerwitzdorf (AT)

(73) Assignee: Plasser & Theurer Export von Bahnbaumaschinen Gesellschaft m.b.H., Vienna (AT)

( * ) Notice: Subject to any disclaimer, the term of this patent is extended or adjusted under 35 U.S.C. 154(b) by 0 days.

(21) Appl. No.: 15/314,625

(22) PCT Filed: Jun. 24, 2015

(86) PCT No.: PCT/EP2015/001264
§ 371 (c)(1),
(2) Date: Nov. 29, 2016

(87) PCT Pub. No.: WO2016/008563
PCT Pub. Date: Jan. 21, 2016

(65) Prior Publication Data
US 2017/0191226 A1    Jul. 6, 2017

(30) Foreign Application Priority Data
Jul. 14, 2014   (AT) .......................... GM 281/2014 U

(51) Int. Cl.
*E01B 27/06*  (2006.01)
*E01B 27/10*  (2006.01)
(Continued)

(52) U.S. Cl.
CPC ................ *E01B 27/06* (2013.01); *B61D 7/12* (2013.01); *B65G 67/08* (2013.01); *E01B 27/10* (2013.01)

(58) Field of Classification Search
CPC .......... E01C 27/06; E01C 27/10; E01B 27/06; E01B 27/10
(Continued)

(56) References Cited

U.S. PATENT DOCUMENTS 3,872,929 A * 3/1975 Teurer ..................... E01B 27/02
                                                                                 104/2
4,135,631 A * 1/1979 Theurer ................. B65G 67/02
                                                                                 141/339
(Continued)

FOREIGN PATENT DOCUMENTS

AT            351 584 B      8/1979
AT            373 833 B      2/1984
(Continued)

OTHER PUBLICATIONS

International Search Report of PCT/EP2015/001264, dated Sep. 24, 2015.

*Primary Examiner* — Gary S Hartmann
(74) *Attorney, Agent, or Firm* — Collard & Roe, P.C.

(57) ABSTRACT

A cleaning vehicle (1) for cleaning ballast (2) of a track (4) with a rail vehicle (10) has a screening installation (15) provided for the ballast cleaning. A gantry crane (6) mobile on the rail vehicle (10) via crane rails (8) in a longitudinal direction (7) of the vehicle is provided for the transport of the ballast (2) stored in containers (11). Forming a discharge station (12) for discharging the soiled ballast (2), a receiving end (13) of a first conveyor belt (14) is provided, the latter having a discharge end (16) positioned above the screening installation (15). Forming a loading station (17) for discharging the cleaned ballast (2) into an empty container (11), a discharge end (18) of a second conveyor belt (19) is provided, the receiving end (20) of which is associated with an outlet opening (21) of the screening installation (15).

4 Claims, 2 Drawing Sheets

(51) Int. Cl.
*B61D 7/12* (2006.01)
*B65G 67/08* (2006.01)

(58) Field of Classification Search
USPC .................. 37/104, 107; 171/16; 104/7.3
See application file for complete search history.

(56) References Cited

U.S. PATENT DOCUMENTS

| | | | | | |
|---|---|---|---|---|---|
| 4,465,414 | A | * | 8/1984 | Theurer | E01B 27/04 414/21 |
| 4,479,439 | A | * | 10/1984 | Theurer | E01B 27/105 104/12 |
| 4,774,890 | A | * | 10/1988 | Theurer | E01B 27/02 104/12 |
| 4,892,151 | A | * | 1/1990 | Theurer | E01B 27/10 171/16 |
| 5,172,636 | A | * | 12/1992 | Theurer | E01B 27/10 104/2 |
| 5,231,929 | A | * | 8/1993 | Theurer | E01B 27/10 104/12 |
| 5,479,725 | A | * | 1/1996 | Theurer | E01B 27/105 104/12 |
| 5,513,452 | A | * | 5/1996 | Theurer | E01B 27/10 104/2 |
| 5,566,619 | A | * | 10/1996 | Theurer | E01B 27/105 104/2 |
| 7,861,439 | B2 | * | 1/2011 | Jager | E01B 27/08 37/104 |
| 9,856,609 | B2 | | 1/2018 | Dehmel | |
| 2015/0345084 | A1 | | 12/2015 | Dehmel | |
| 2016/0312411 | A1 | * | 10/2016 | Brunninger | E01B 27/10 |

FOREIGN PATENT DOCUMENTS

| | | |
|---|---|---|
| CN | 102154960 A | 8/2011 |
| EP | 1 254 987 | 11/2002 |
| WO | 2014/076160 A1 | 5/2014 |

* cited by examiner

CLEANING VEHICLE FOR CLEANING BALLAST OF A TRACK

CROSS REFERENCE TO RELATED APPLICATIONS

This application is the National Stage of PCT/EP2015/001264 filed on Jun. 24, 2015, which claims priority under 35 U.S.C. § 119 of Austrian Application No. GM 281/2014 filed on Jul. 14, 2014, the disclosures of which are incorporated by reference. The international application under PCT article 21(2) was not published in English.

BACKGROUND

The invention relates to a cleaning vehicle for cleaning ballast of a track, including a rail vehicle and a screening installation provided for ballast cleaning, and to a method.

Vehicles of this type are known from AT 351 584 or AT 373 833. Spoil discharged by the cleaning vehicle is stored in containers which are deposited with the aid of a gantry crane on loading areas of rail vehicles.

SUMMARY

It is the object of the present invention to provide a cleaning vehicle and a method of the kind mentioned at the beginning with which a simplified cleaning of ballast is possible.

According to the invention, this object is achieved with a cleaning vehicle as well as with a method of the specified type by way of the features cited in the characterizing part of claim 1.

By way of the features according to the invention, a structurally relatively simple cleaning of ballast can be achieved, wherein the ballast transport can be carried out largely by means of containers.

Additional advantages of the invention become apparent from the dependent claims and the drawing description.

BRIEF DESCRIPTION OF THE DRAWINGS

The invention will be described in more detail below with reference to an embodiment represented in the drawing.

DETAILED DESCRIPTION

Figure 1:
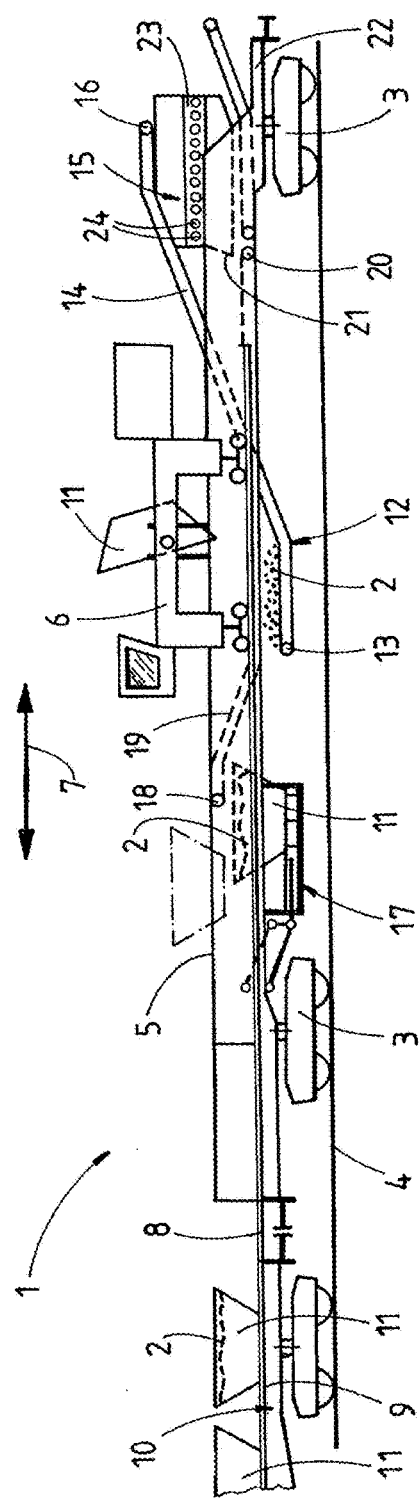
FIG. 1 is a first view of the invention.

A cleaning vehicle 1, shown in a side view, for cleaning ballast 2 has a vehicle frame 5 which is mobile on a track 4 by means of on-track undercarriages 3. Crane rails 8 extending in a longitudinal direction 7 of the vehicle are provided for mobility of a gantry crane 6. Ballast 2 is stored in a plurality of containers 11 designed for placement on loading areas 9 of adjoining rail vehicles 10.

Forming a discharge station 12 for discharging the soiled ballast 2, a receiving end 13 of a first conveyor belt 14 is provided, the latter having a discharge end 16 positioned above a screening installation 15.

Figure 2:
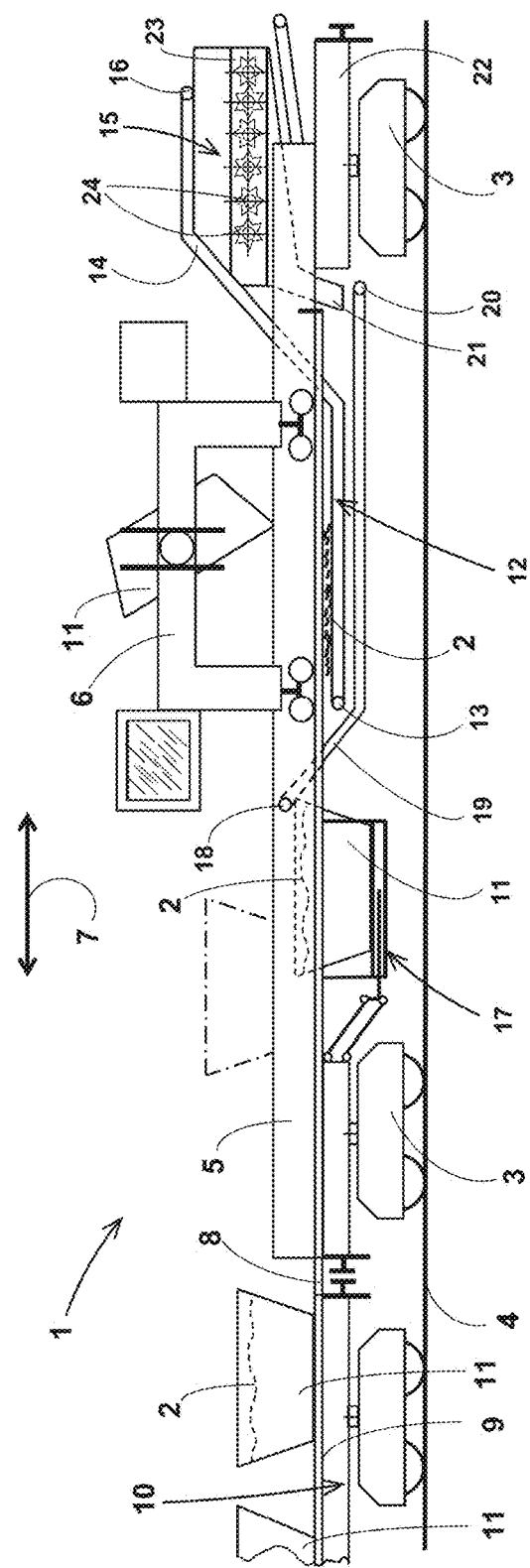
FIG. 2 is a second side view of the invention showing the star screen.

Forming a loading station 17 for discharging the cleaned ballast 2 into an empty container 11, a discharge end 18 of a second conveyor belt 19 is provided, the receiving end 20 of which is associated with an outlet opening 21 of the screening installation 15 (See also FIG. 2).

The loading- and discharge stations 17, 12, arranged one behind the other with regard to the longitudinal direction 7 of the vehicle, are arranged between two on-track undercarriages 3, while the screening plant 15 is positioned at an end 22 of the of the vehicle frame 5. The receiving end 13 of the first conveyor belt 14 and the loading station 17 are each arranged underneath the vehicle frame 5 between the two crane rails 8.

The screening plant 15 is designed as a star screen 23 (See FIG. 2) having a multitude of rotatable cleaning rollers 24 arranged one following the other in the longitudinal direction 7 of the vehicle. Alternatively, other known embodiments are also possible, of course.

The mode of operation of the cleaning vehicle 1, or the method for cleaning ballast 2 which can be carried out with said vehicle, will now be described briefly. In this, the described transport manoeuvres of the containers 11 are carried out by means of the gantry crane 6. Soiled ballast 2 is transported in a container 11 from the loading area 9—containing a multitude of containers 11—of the vehicle 10 to a discharge station 12 and dumped there. By means of the first conveyor belt 14, the ballast is transported to the screening installation 15. The emptied container 11 is placed on a loading station 17 and filled by means of the second conveyor belt 19 with ballast 2 cleaned in the screening installation 15. Subsequently, the filled container 11 is transported back to the loading area 9 and placed on the same. The cycle is then repeated anew.

The invention claimed is:

1. A cleaning vehicle for cleaning ballast of a track, including a rail vehicle comprising:
   a screening installation coupled to the rail vehicle and provided for ballast cleaning;
   a plurality of crane rails disposed on the rail vehicle;
   at least one container;
   a gantry crane mobile on the rail vehicle via said plurality of crane rails in a longitudinal direction of wherein the rail vehicle is provided for the transport of soiled and cleaned ballast stored in said at least one containers,
   a first conveyor belt having a receiving end;
   a discharge station for discharging the soiled ballast out of said at least one container onto said receiving end of said first conveyor belt is provided, the latter having a discharge end positioned above the screening installation,
   a second conveyor belt having a receiving end positioned below the screening installation and configured to receive cleaned ballast and a discharge end configured to dispose of said cleaned ballast;
   a loading station for receiving discharged cleaned ballast into an empty container of said at least one container.

2. The cleaning vehicle according to claim 1, further comprising two on-track undercarriages, wherein the loading and discharge stations, arranged one behind the other with regard to the longitudinal direction of the vehicle, are arranged between said two on-track undercarriages, while the screening plant is positioned at an end of a vehicle frame.

3. The cleaning vehicle according to claim 1, wherein the receiving end of the first conveyor belt and the discharge end of the second conveyor belt are each arranged underneath the vehicle frame between the crane rails.

4. The cleaning vehicle according to claim 1, wherein the screening plant is designed as a star screen having a multitude of rotatable cleaning rollers arranged one following the other in the longitudinal direction of the vehicle.

* * * * *